United States Patent [19]
Küpper

[11] 3,934,718
[45] Jan. 27, 1976

[54] SUPPLY CONTAINER WITH CONVEYOR BELT FOR RECEIVING AND SUITABLY ORIENTING TEXTILE COILS OR THE LIKE

[75] Inventor: Willi Küpper, Rickelrath, Germany

[73] Assignee: W. Schlafhorst & Co., Monchen-Gladbach, Germany

[22] Filed: Sept. 11, 1973

[21] Appl. No.: 396,250

[30] Foreign Application Priority Data
Sept. 15, 1972 Germany.............................. 2245375

[52] U.S. Cl. .................... 198/287; 198/57; 221/156
[51] Int. Cl.² ......................................... B65G 47/14
[58] Field of Search............. 198/33 AA, 57, 58, 54, 198/55, 198, 287; 221/156, 171, 172

[56] References Cited
FOREIGN PATENTS OR APPLICATIONS
2,019,923  11/1971  Germany......................... 198/33 AA
920,477  10/1954  Germany ........................... 198/198

*Primary Examiner*—Richard A. Schacher
*Assistant Examiner*—Douglas D. Watts
*Attorney, Agent, or Firm*—Herbert L. Lerner

[57] ABSTRACT

A combination of a supply container and a conveyor belt for receiving and orienting textile coils and the like includes a conveyor surface extending into said supply container, at least part of said conveyor surface having cover means disposed so as to divert at least part of the textile coils from said conveyor surface.

4 Claims, 3 Drawing Figures

SUPPLY CONTAINER WITH CONVEYOR BELT FOR RECEIVING AND SUITABLY ORIENTING TEXTILE COILS OR THE LIKE

The invention relates to a supply container or hopper with a conveyor belt for receiving and suitably orienting textile coils or the like. More particularly, the conveyor belt extends into the supply container or hopper in order to remove the coils from the hopper at a supply location thereof and to pass them on to a discharge location.

It has been found that surface damage occurred in some coils such as actual injury to the thread or yarn, for example, or displacement of the yarn windings, so that the unwinding process was impeded. Another disadvantage of heretofore known apparatus or combinations of the foregoing general type is that the coils are advanced upwardly a given distance by the conveyor belt but that then a rather large number thereof falls back again. This process is continually repeated, so that the free ends of the threads get wound together into a ball, and difficulties result therefrom when separating the coils. The heretofore known devices of the general type of the invention of this application have the further disadvantage that the quantity of coils advanced varies, depending upon whether the supply container or hopper is full or empty. Although this can be corrected by varying the conveyor speed gradually as the supply container or hopper goes from full to empty, this demands additional expenditures.

It is accordingly an object of the invention of the instant application to provide a combination that eliminates the afore-mentioned shortcomings of the heretofore known devices of this general type.

With the foregoing and other objects in view, there is provided, in accordance with the invention, in combination, a supply container and a conveyor belt for receiving and orienting textile coils and the like, the conveyor belt having a conveyor surface extending into the supply container, at least part of the conveyor surface having cover means disposed so as to divert at least part of the textile coils from the conveyor surface.

Through this construction of the invention, not all of the coils lie on top of one another on the conveyor belt, but only in the uncovered part of the conveyor surface in the region of the supply location thereof. Since this region of the supply location is relatively short in length, as viewed in the direction of travel of the conveyor belt, the underlying coils or the like are not subjected to continuous frictional stress with the spools lying on top thereof. Moreover, fewer coils than heretofore are entrained simultaneously due to the diminished supply, or charging area, so that also fewer coils fall back, and the formation of snarls or tangles is thereby reduced or prevented. Furthermore, by means of the cover provided in accordance with the invention, the delivered output from a full to an empty supply container or hopper is maintained nearly constant, so that readjustments of the conveyor speed are no longer required.

The cover means provided according to the invention can extend over the entire width of the conveyor belt or only over parts of the width thereof. In accordance with a particularly advantageous feature of the invention, the cover means comprise two collecting shells defining therebetween, above the conveyor surface, a gap extending in the longitudinal direction of the conveyor belt and sloping toward or being inclined to the edges of the conveyor belt. By this construction, coils are prevented from getting jammed under the cover means so as to completely prevent further advancement or even movement of the conveyor belt because of the jamming. With the invention of the instant application, the coils can escape upwardly through the gap, so that clamping thereof cannot occur. Due to the other feature of having the collecting shells slope toward the edges of the conveyor belt, not all of the coils have to be propped up or supported at the supply or charging location, but can rather be supported laterally at the side walls of the conveyor belt and at inclined base plates, and slide therefrom gradually to the charging or supply location, depending upon the rate at which they are used up.

In accordance with a further feature of the invention, the collecting shells are disposed parallel or substantially parallel to the conveyor belt, which is inclined to the horizontal, so that the continuous feeding of the coils can be advanced to the charging or supply location. It is, however, also advantageous to construct the collecting shells in accordance with the invention, so that they expose an increased conveyor surface in direction toward the deepest point of the supply container or hopper. In this manner, an increased i.e. greater, uncovered conveyor surface is provided in the area of the supply or charging location, by which premature cogging or up-ending of the coils at the cover means is avoided.

It has been known heretofore to provide the conveyor surface of the conveyor belt with mutually offset or staggered entrainer members, in order to improve the conveyance or advancement of the coils. It is possible, however, for the coils to become caught or jammed between the entrainer members and the cover means, particularly if collecting shells are used and are constructed so that they expose an increased conveyor surface at the lowest or deepest point of the supply container or hopper and therefore necessarily have two terminating edges running transversely or diagonally to the direction of the conveyor belt. In order to prevent such blocking due to jamming of the coils between the entrainer members and the transverse or diagonal terminating edges of the collecting shells, there is provided, in accordance with an additional feature of the invention, that the entrainer members are disposed in oppositely-directed diagonal or transverse rows extending outwardly from the middle of the conveyor surface, preferably in the form of a herringbone pattern, so that the rows of entrainer members in the left-hand side of the conveyor surface, as viewed in the upper half of FIG. 2, begin from the middle of the conveyor belt between the rows of entrainer members of the right-hand side of the conveyor surface, as viewed in the lower half of FIG. 2.

Other features which are considered as characteristic for the invention are set forth in the appended claims.

Although the invention is illustrated and described herein as embodied in supply container with conveyor belt for receiving and suitably orienting textile coils or the like, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description when read in connection with the accompanying drawings, in which.

Figure 1:
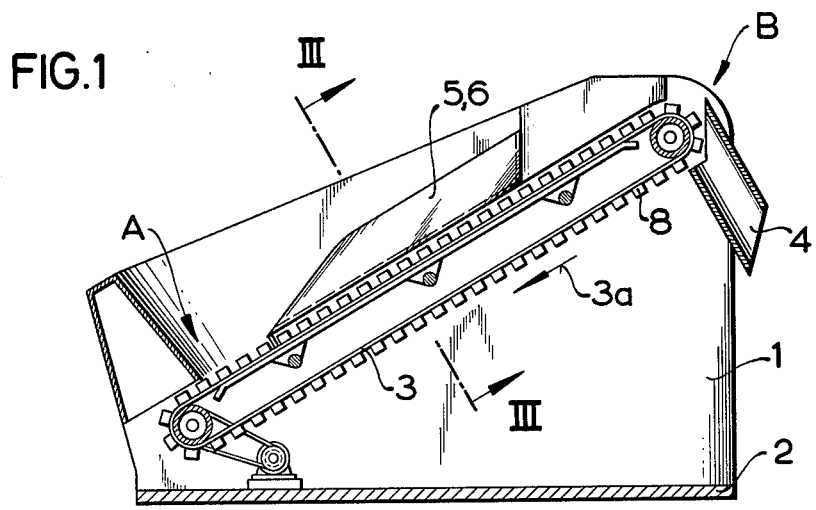
FIG. 1 is a longitudinal sectional view of the inventive combination taken along the line I—I of FIG. 2 in the direction of the arrows.

Referring now to the figures of the drawing, there is shown therein a supply container or hopper formed of a frame with vertical limiting walls 1, which are assembled on a base plate 2. A conveyor belt 3, which conveys or transports coils from a supply or charging location A to a discharge location B, which, in the case at hand, is a slide trough or chute 4, extends into the supply container or hopper. The conveyor belt 3 travels in the direction of the arrows 3a.

As is readily apparent from the figures, part of the conveyor surface of the conveyor belt 3 extending into the supply container or hopper is provided with a covering formed of two collecting shells 5 and 6. Above the conveyor surface of the conveyor belt 3, the two collecting shells 5 and 6 define a gap 7 therebetween running first in longitudinal direction of the conveyor belt 3, and then falling off or sloping toward the edges 3b of the conveyor belt. If the collecting shells are additionally disposed parallel or substantially parallel to the conveyor belt, which is inclined to the horizontal, as shown in the illustrated embodiment, one could say that the collecting shells 5 and 6 cover the conveyor belt like a saddle roof, the ridge of the saddle roof, however, being opened up and forming the gap 7. If a very large quantity of coils or the like, which are disposed on top of one another, is advanced or conveyed, the coils cannot get jammed or clamped under the covering formed by the two shells 5 and 6 but can escape through the gap 7.

Figure 2:
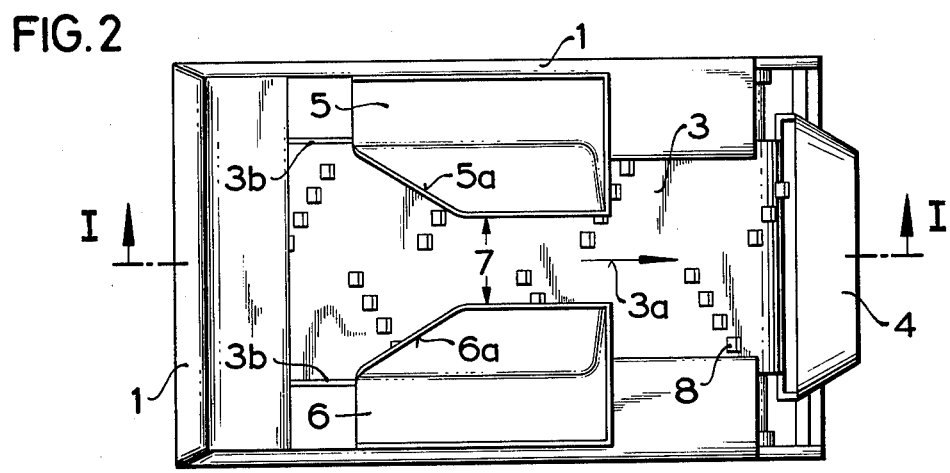
FIG. 2 is a top plan view of the supply container or hopper and the conveyor belt of the invention.
Figure 3:
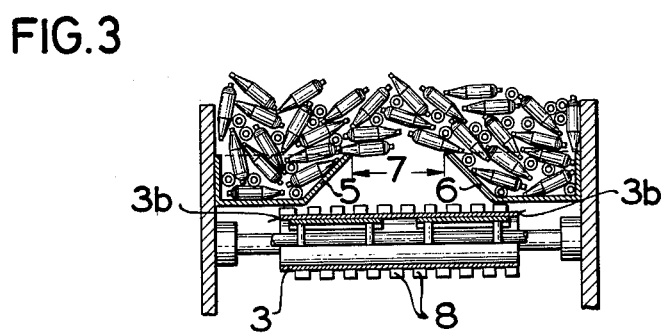
FIG. 3 is a cross-sectional view of FIG. 1 taken along the line III—III in the direction of the arrows.

The coils or the like, such as textile coils, particularly, are randomly thrown into the supply container or hopper, and, as is very clearly shown in FIG. 3 in an example which includes spinning cops, the coils form a bridge over the gap 7, so that the conveyor belt is relieved of the weight of the coils or cops lying above. Naturally, the coils slide down to the supply or charging location A on the two cover members 5 and 6, if a sufficiently adequate number of coils have been conveyed by the conveyor belt to the discharge location B. The transfer from the two collecting shells 5 and 6 to the conveyor belt then takes place not only in the lower region but also in the area therebetween, due to the collapse of the bridge formed by the coils over the gap 7. Nevertheless, it may be advantageous for the collecting shells 5 and 6 to be so shaped that they expose an increased or larger conveyor surface of the conveyor belt in direction toward the lowest point of the supply container or hopper, and are, for example, constructed in a manner similer to the collecting shells according to FIG. 2 with sloping edges 5a and 6a.

It is generally of advantage, in accordance with the invention, to provide the conveyor surface of the conveyor belt 3 with staggered entrainer members or dogs 8. As is clearly seen from FIG. 2, the entrainer members 8 are disposed in oppositely directed diagonal or transverse rows extending outwardly from the middle of the conveyor surface, the oppositely disposed arrangement being such that, in condition of rest, the rows run toward the edges 5a and 6a of the collecting shells. For this reason, the coils lying on the conveyor belt cannot be caught or jammed between the dogs or entrainer members 8 and the edges 5a and 6a of the collecting shells even in an extremely unfavorable position and cause consequent blockage of the conveyor belt.

I claim:

1. In combination, a supply container and a conveyor belt for receiving and orienting textile coils and the like, said conveyor belt having a conveyor surface extending into said supply container, at least part of said container extending over said conveyor surface, said container having diverting cover means disposed so as to divert at least part of the textile coils from said conveyor surface, wherein said cover means comprises two collecting shells defining, above said conveyor surface, a gap extending in longitudinal direction of said conveyor belt and sloping toward the edges of said conveyor belt, said gap being shaped so that coils can escape upwardly through the gap, said cover means being spaced above said conveyor surface a distance several times greater than the diameter of said coils, so as not to interfere with coils properly held on said conveyor surface.

2. The combination of claim 1 wherein said conveyor belt is inclined to the horizontal, and said collecting shells are disposed substantially parallel to said conveyor belt.

3. The combination of claim 1, wherein said collecting shells are constructed so that said gap exposes an increased conveyor surface in direction toward the deepest point of said supply container.

4. The combination of claim 1, including mutually offset entrainer members mounted on the conveyor surface of said conveyor belt, said entrainer members being disposed in oppositely-directed transverse rows extending outwardly from the middle of said conveyor surface.

* * * * *